(12) United States Patent
Kim et al.

(10) Patent No.: US 12,331,776 B2
(45) Date of Patent: Jun. 17, 2025

(54) PARALLEL-TAPERED-INTEGRATED SCREW-COUPLING STRUCTURE FOR CONNECTING REINFORCING BARS

(71) Applicant: Yong-Keun Kim, Incheon (KR)

(72) Inventors: Yong-Keun Kim, Incheon (KR); Tae-Kyung Kim, Incheon (KR)

(73) Assignee: Yong-Keun Kim, Incheon (KR)

( * ) Notice: Subject to any disclaimer, the term of this patent is extended or adjusted under 35 U.S.C. 154(b) by 602 days.

(21) Appl. No.: 17/777,047

(22) PCT Filed: Dec. 3, 2020

(86) PCT No.: PCT/KR2020/017562
§ 371 (c)(1),
(2) Date: May 15, 2022

(87) PCT Pub. No.: WO2021/112594
PCT Pub. Date: Jun. 10, 2021

(65) Prior Publication Data
US 2022/0403865 A1    Dec. 22, 2022

(30) Foreign Application Priority Data
Dec. 4, 2019    (KR) .......................... 10-2019-0159505

(51) Int. Cl.
*F16B 7/18*    (2006.01)
(52) U.S. Cl.
CPC .................................. *F16B 7/182* (2013.01)
(58) Field of Classification Search
CPC ................................................ E21B 17/0423
See application file for complete search history.

(56) References Cited

U.S. PATENT DOCUMENTS

| | | | |
|---|---|---|---|
| 3,415,552 A | | 12/1968 | Howlett |
| 3,850,535 A | * | 11/1974 | Howlett .................. F16B 7/182 |
| | | | 403/312 |

(Continued)

FOREIGN PATENT DOCUMENTS

| | | |
|---|---|---|
| JP | 02-105685 U | 8/1990 |
| JP | 04-157292 A | 5/1992 |

(Continued)

OTHER PUBLICATIONS

International Search Report for PCT/KR2020/017562 mailed Mar. 2, 2021 from Korean Intellectual Property Office.

*Primary Examiner* — Matthew R McMahon
(74) *Attorney, Agent, or Firm* — Revolution IP, PLLC

(57) ABSTRACT

In a screw-coupling structure between an internally-threaded body and an externally-threaded body, for connecting reinforcing bars: the internally-threaded body includes, on the inner diameter thereof, a parallel-tapered-integrated internal thread section formed by integrating a parallel internal thread section formed as a parallel screw thread, with a tapered internal thread section formed on one end of the parallel internal thread section so that the minor diameter thereof gradually narrows; and the externally-threaded body comprises, on the outer diameter thereof, a parallel-tapered-integrated external thread section formed by integrating a parallel external thread section formed as a parallel screw thread, with a tapered external thread section formed on one end of the parallel external thread section so that the major diameter thereof gradually narrows.

6 Claims, 16 Drawing Sheets

(56) References Cited

U.S. PATENT DOCUMENTS

| | | | | |
|---|---|---|---|---|
| 4,244,607 | A * | 1/1981 | Blose | F16L 15/009 |
| | | | | 285/334 |
| 4,431,219 | A * | 2/1984 | Brewer | E21B 17/0423 |
| | | | | 285/333 |
| 4,537,429 | A * | 8/1985 | Landriault | E21B 17/0423 |
| | | | | 285/369 |
| 4,696,498 | A * | 9/1987 | Church | F16L 15/002 |
| | | | | 285/334 |
| 5,411,347 | A * | 5/1995 | Bowmer | E04C 5/165 |
| | | | | 52/848 |
| 6,880,224 | B2 * | 4/2005 | Colarusso | E04C 5/03 |
| | | | | 403/307 |
| 7,007,984 | B2 * | 3/2006 | Church | F16L 15/002 |
| | | | | 285/333 |
| 8,220,844 | B2 * | 7/2012 | Gillot | F16L 15/002 |
| | | | | 285/390 |
| 10,352,046 | B2 * | 7/2019 | Prowse | E04B 1/215 |
| 11,697,971 | B2 * | 7/2023 | Campbell | F16L 15/002 |
| | | | | 285/334 |
| 2008/0296894 | A1* | 12/2008 | Bailey | F16L 15/004 |
| | | | | 285/334 |
| 2010/0171306 | A1 | 7/2010 | Gillot et al. | |
| 2014/0010590 | A1* | 1/2014 | Stewart | E04B 1/388 |
| | | | | 403/345 |
| 2016/0208492 | A1* | 7/2016 | Kim | E04C 5/165 |
| 2017/0081853 | A1* | 3/2017 | Kim | E04C 5/165 |
| 2024/0052710 | A1* | 2/2024 | Owoeye | F16L 15/002 |

FOREIGN PATENT DOCUMENTS

| | | |
|---|---|---|
| JP | 06-028466 U | 4/1994 |
| JP | 2010-531418 A | 9/2010 |
| KR | 10-2005-0042528 A | 5/2005 |

* cited by examiner

【Figure 1】
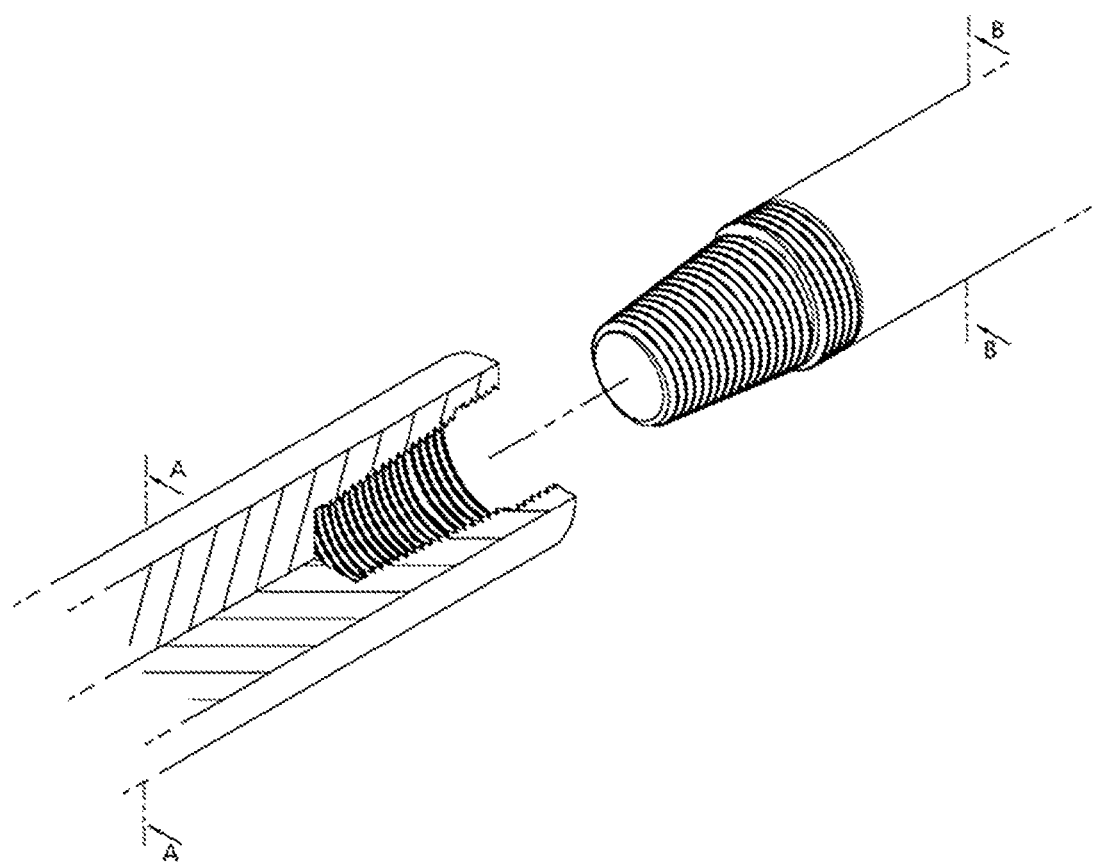

【Figure 2】
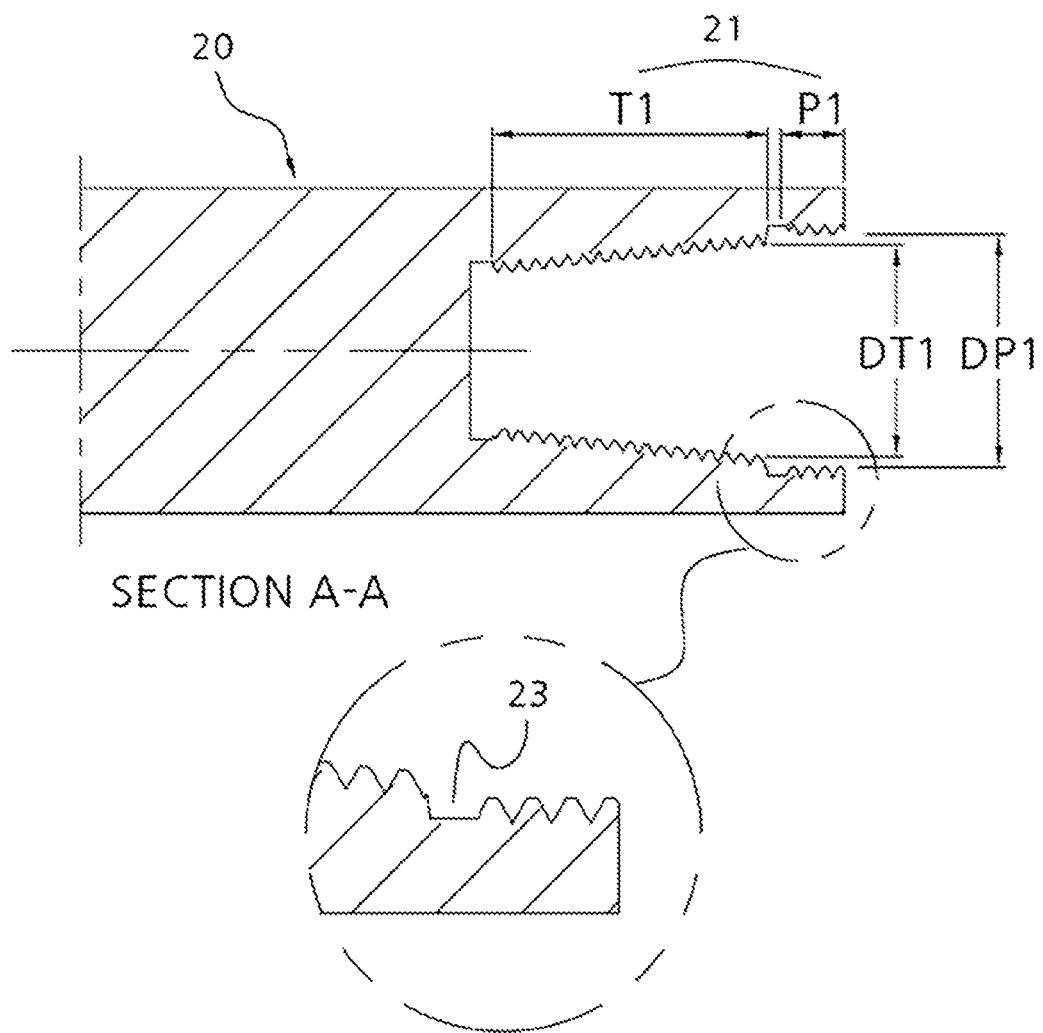

[Figure 3]
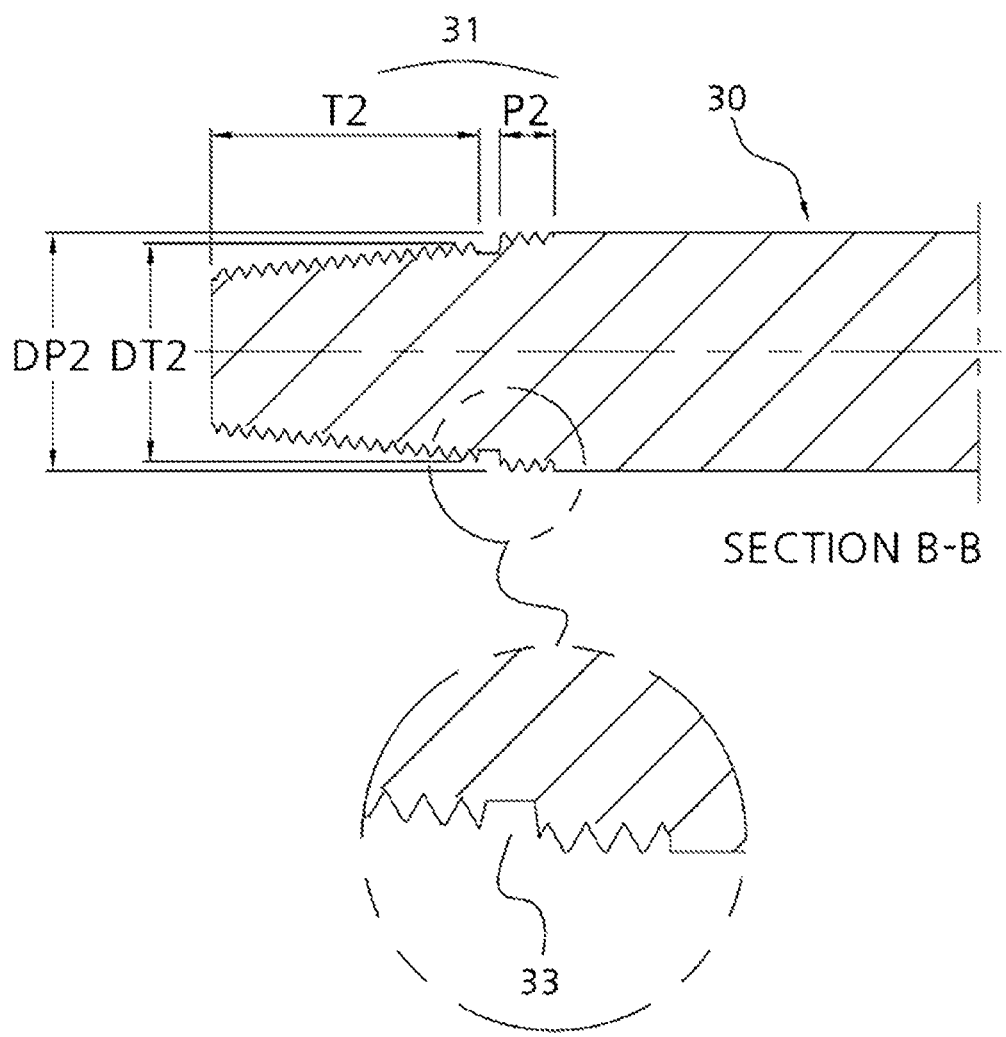

【Figure 4】
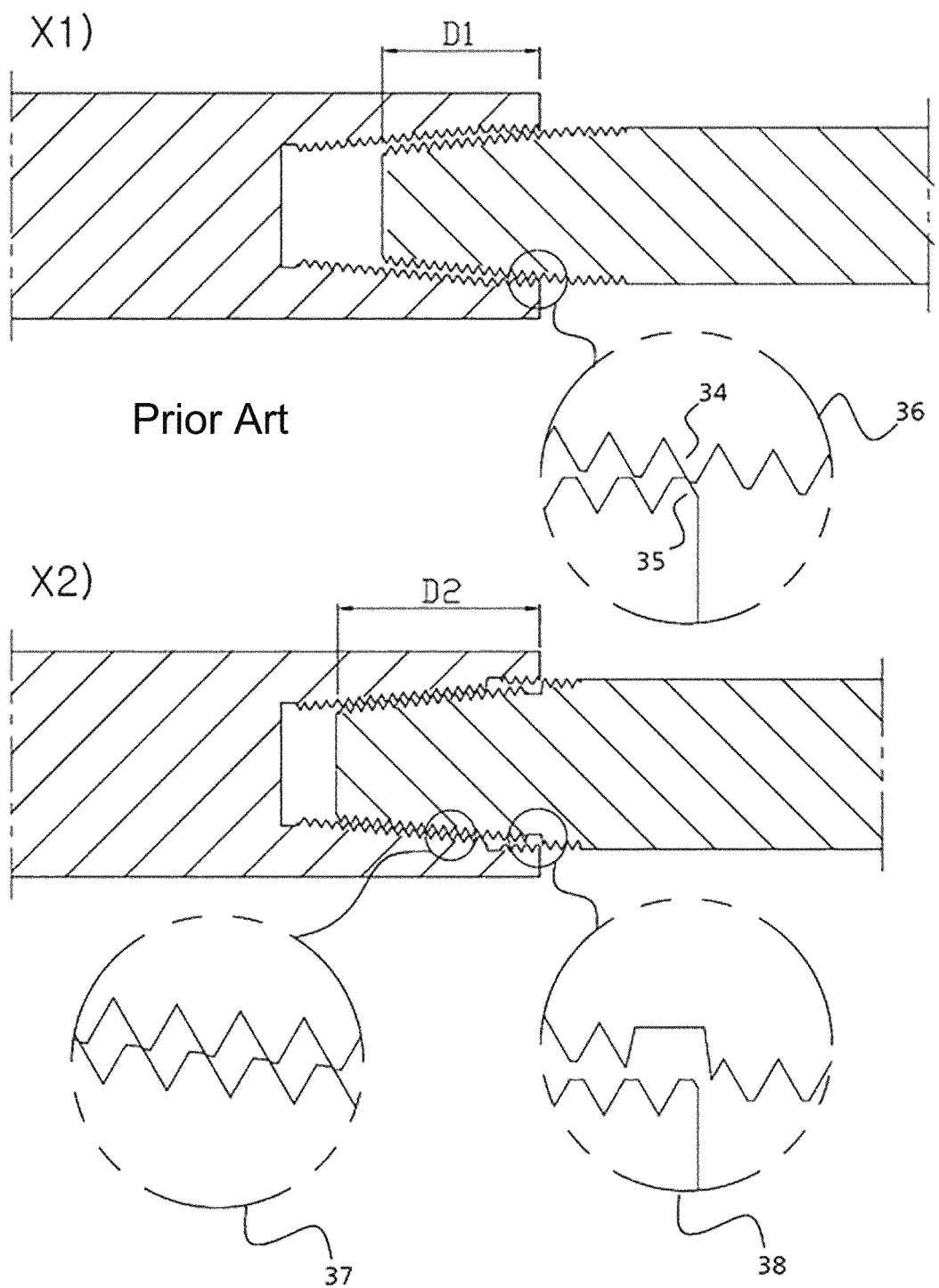

【Figure 5】
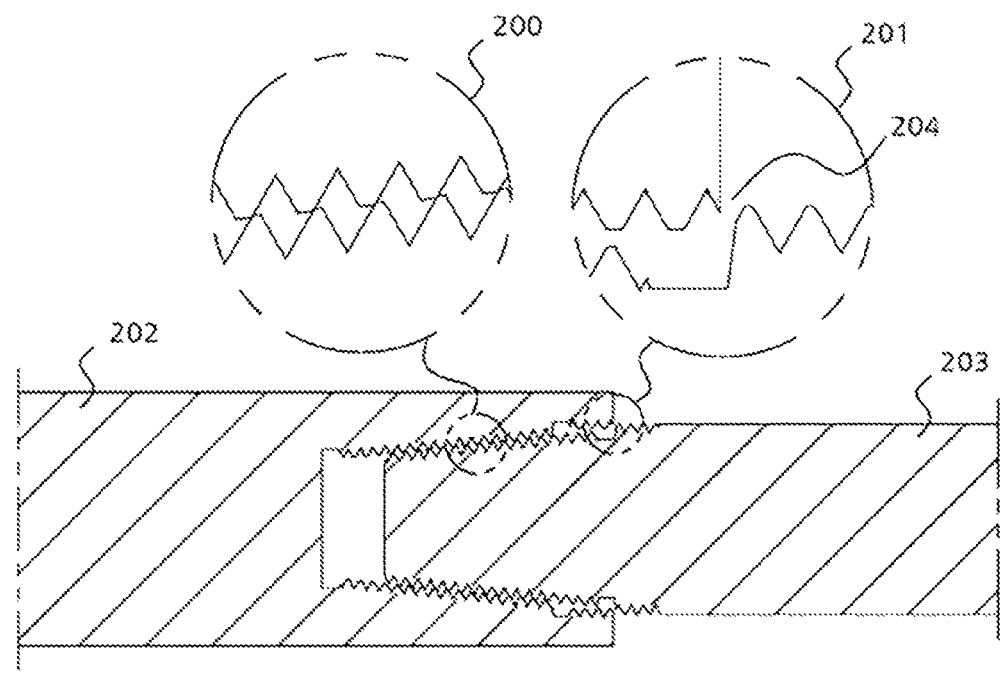

【Figure 6】
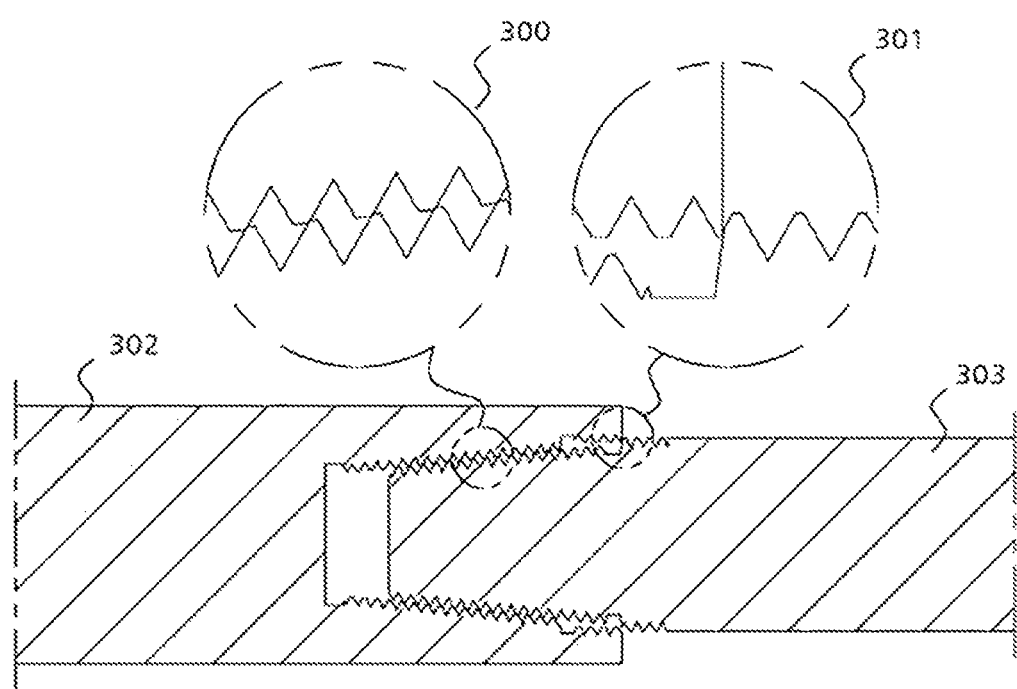

[Figure 7]
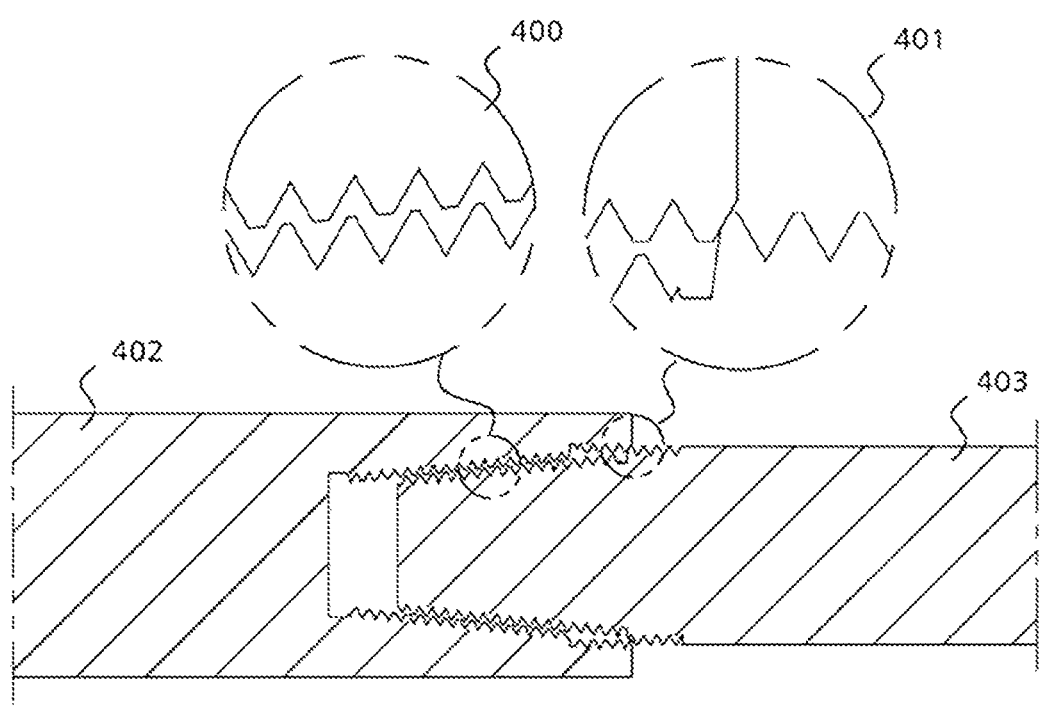

【Figure 8】
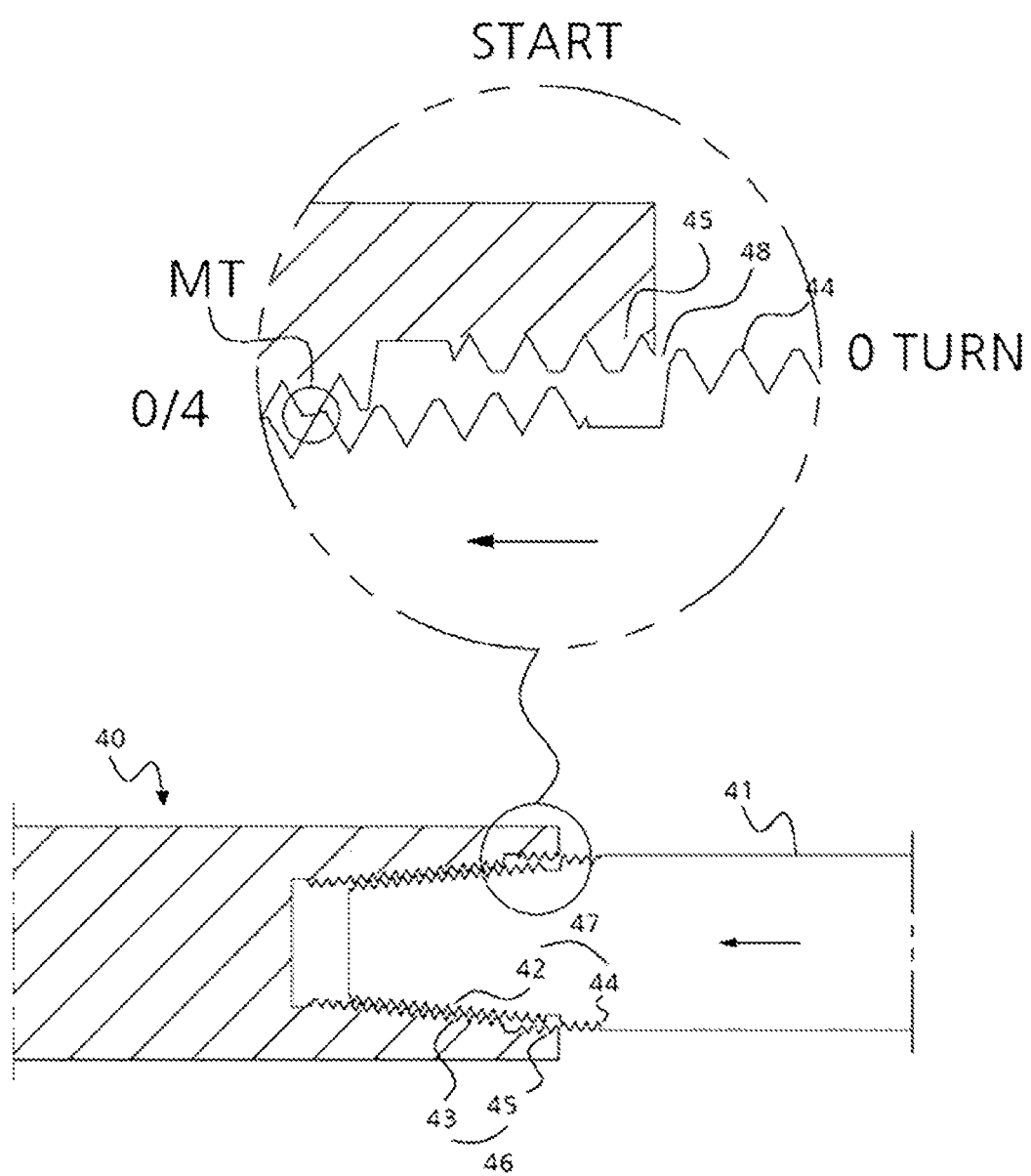

【Figure 9】
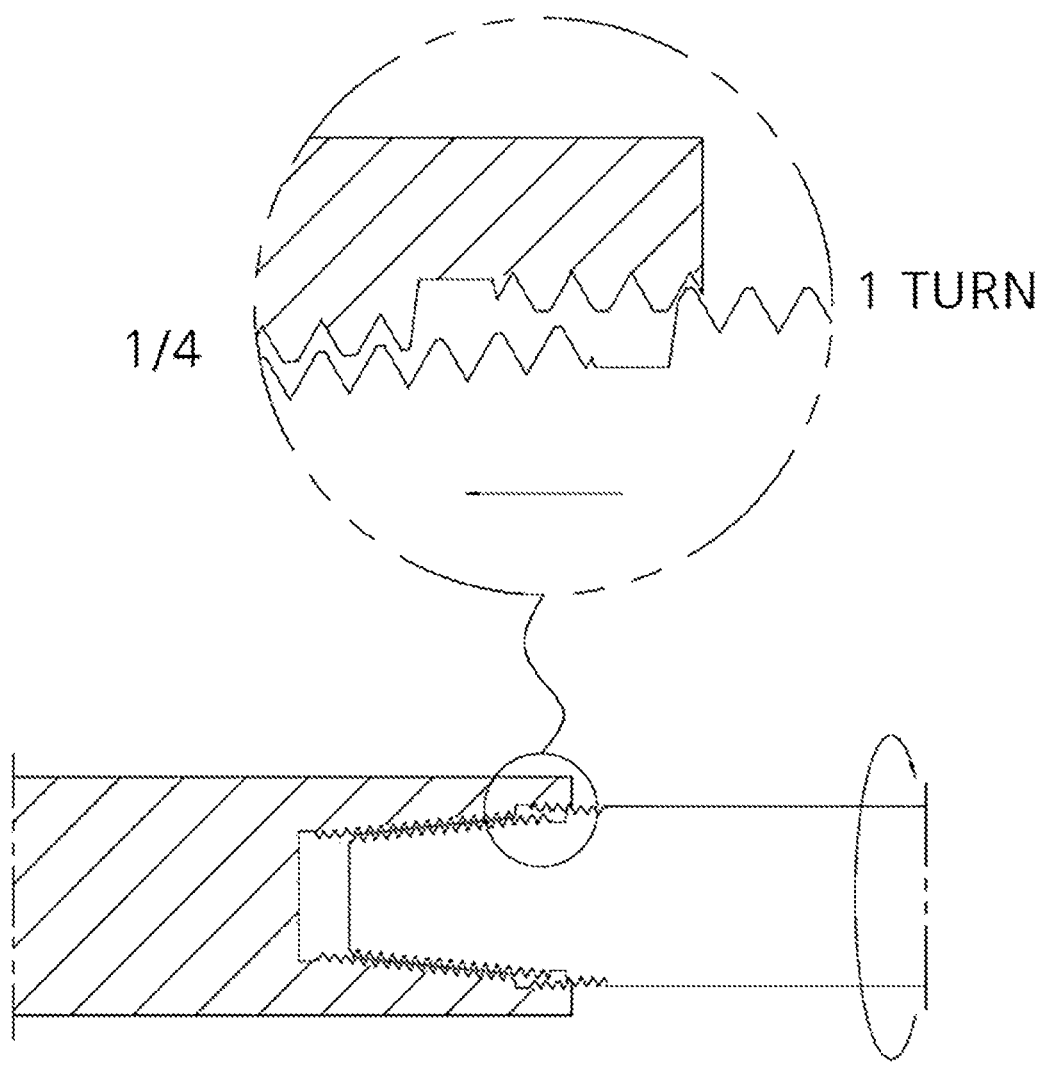

【Figure 10】
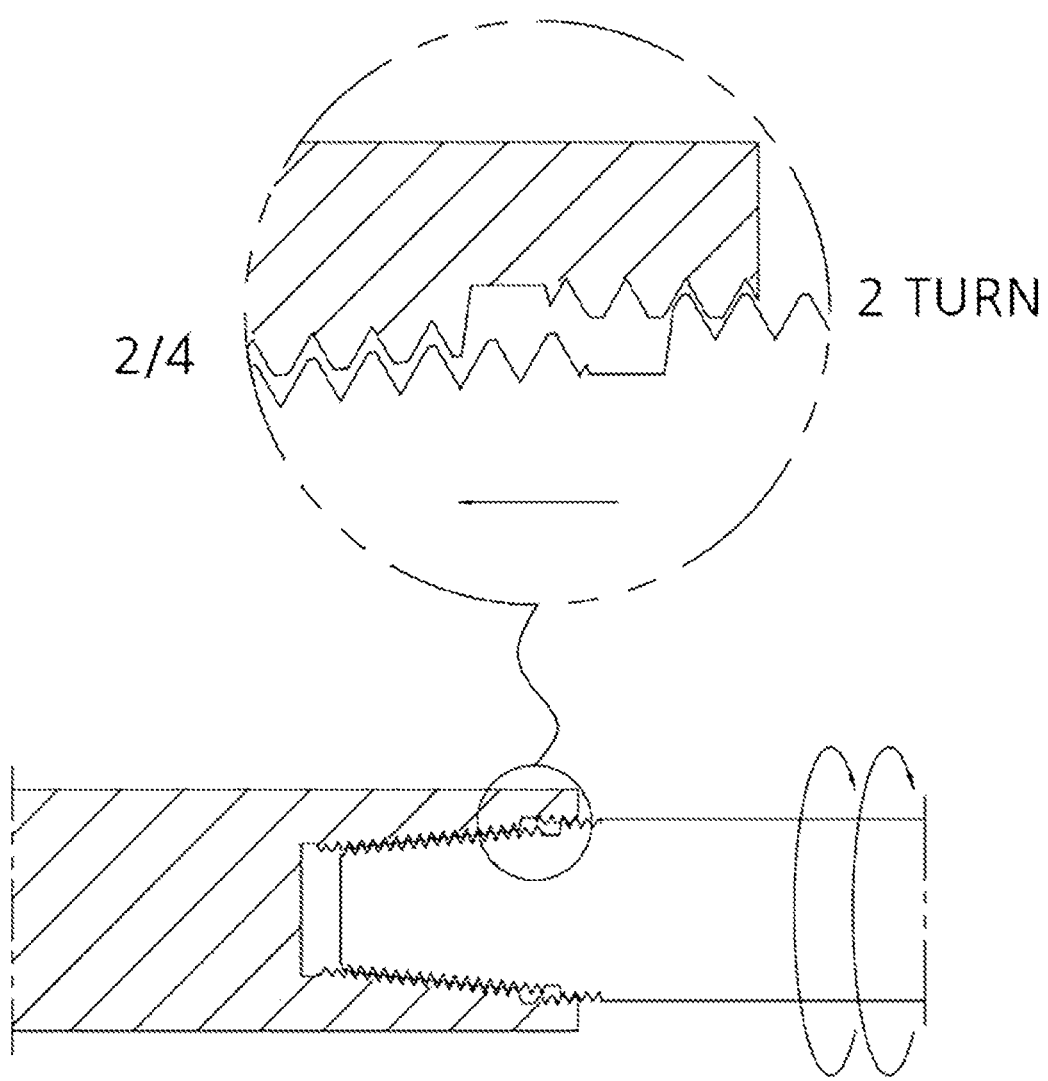

【Figure 11】
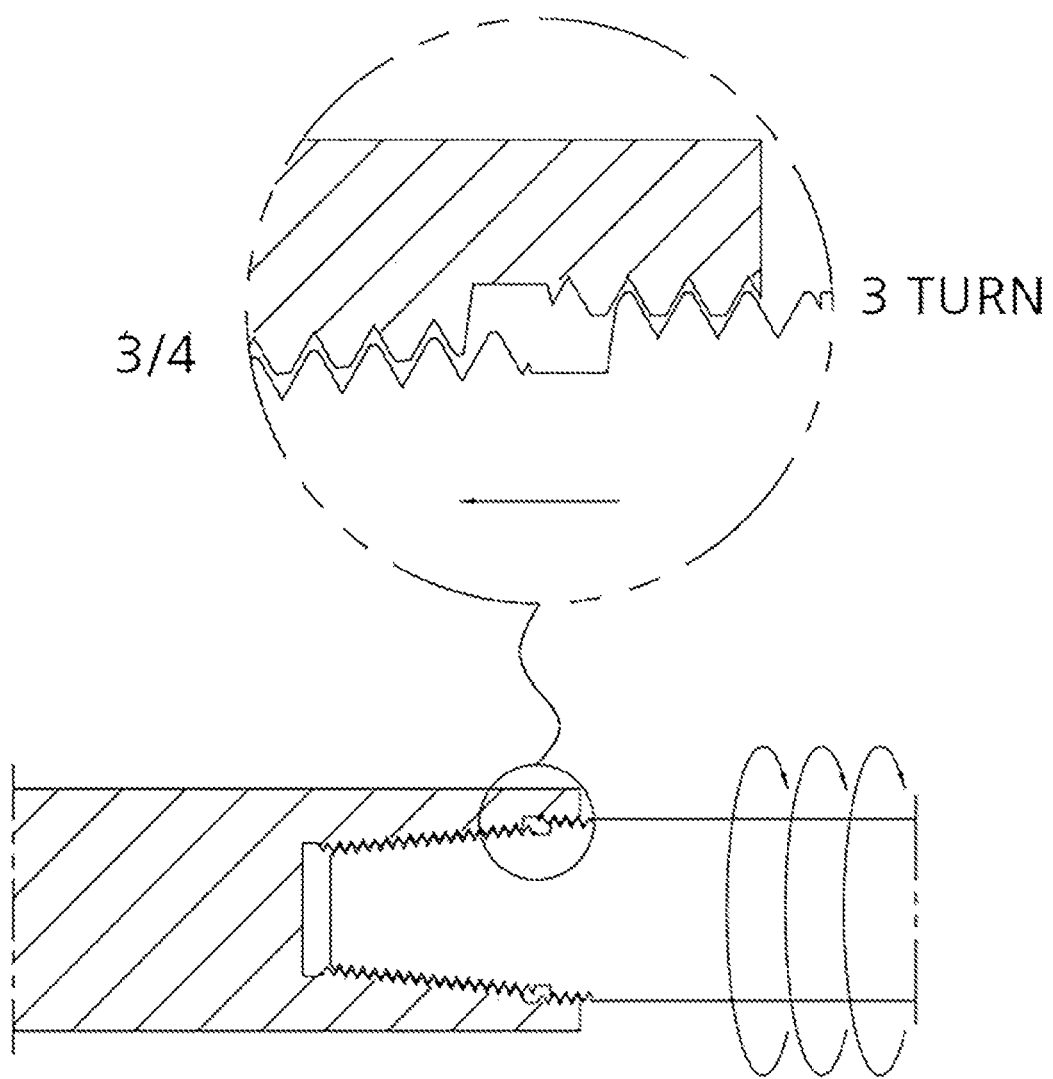

【Figure 12】
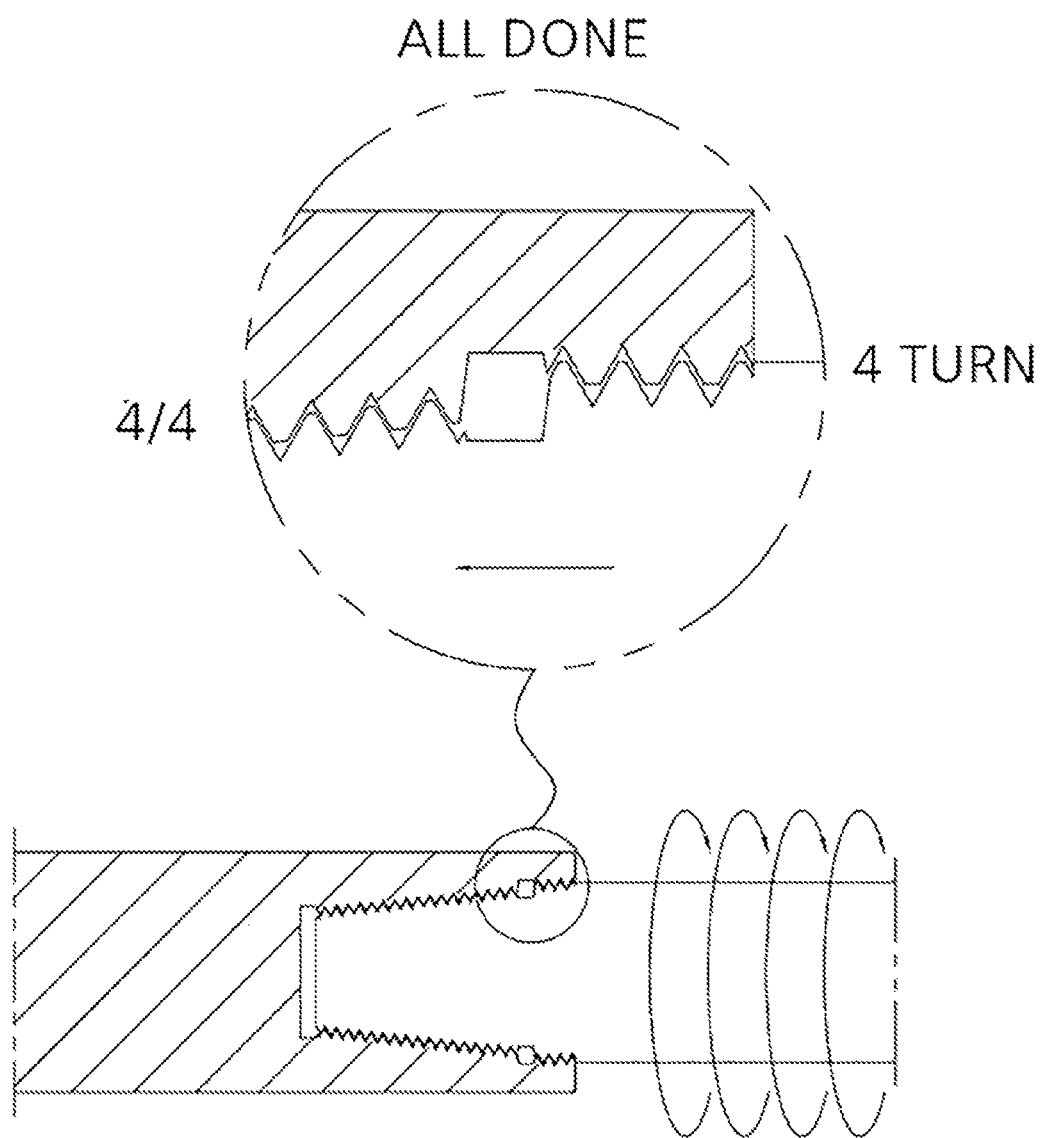

【Figure 13】
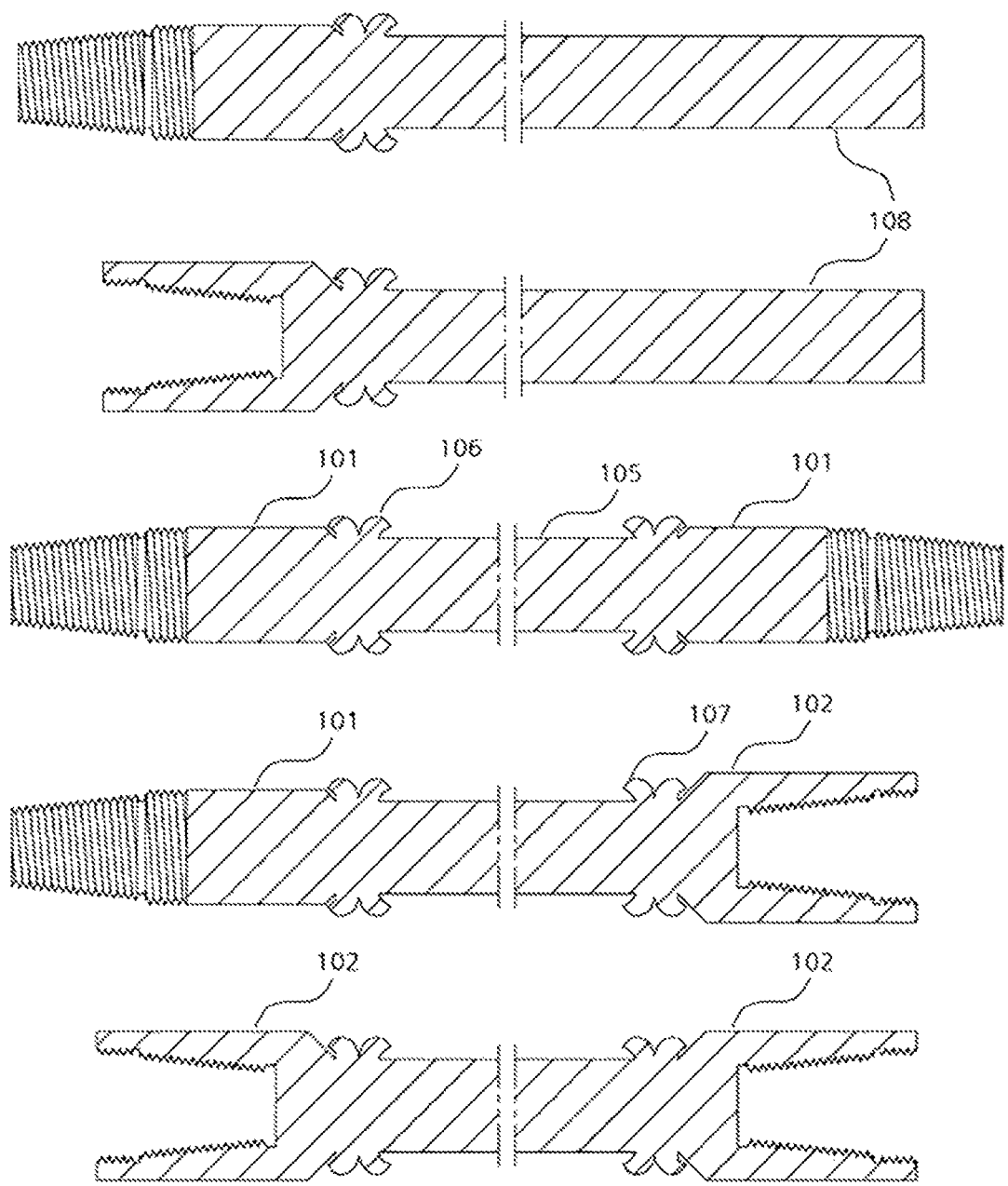

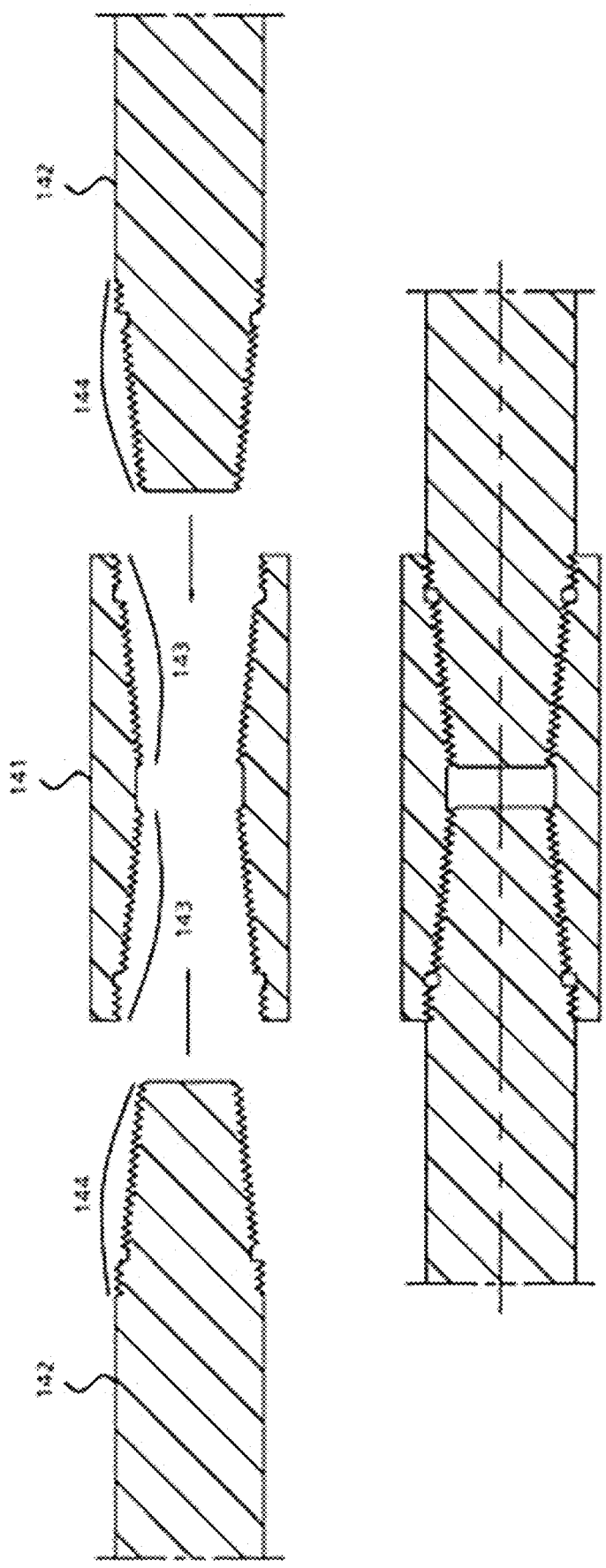
[Figure 14]

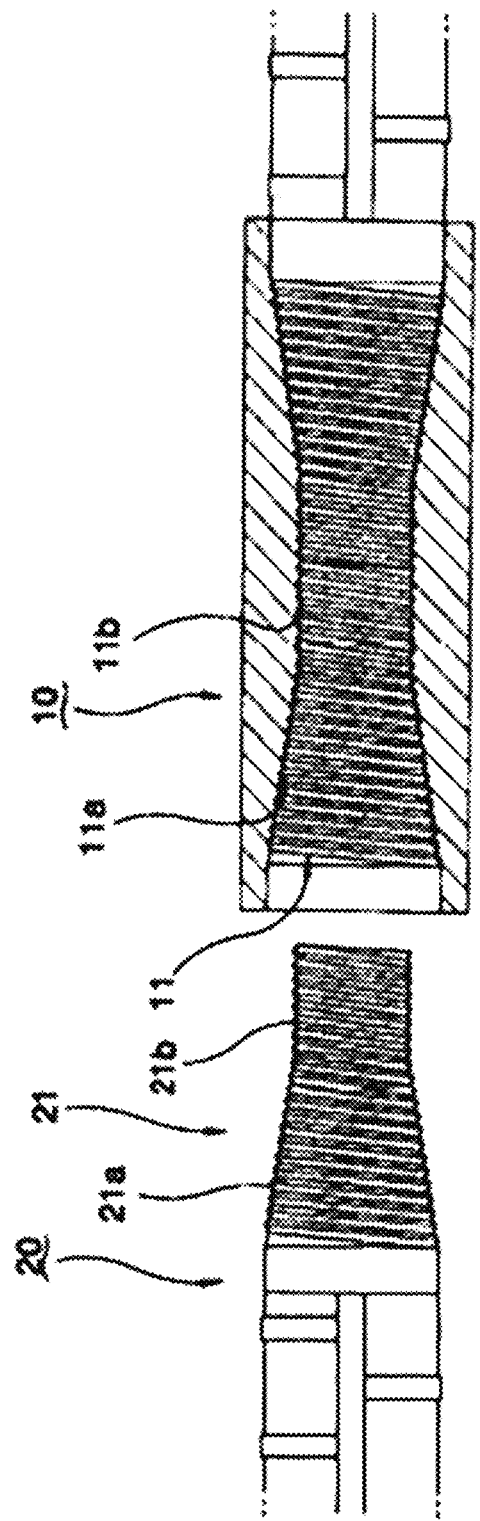
[Figure 15]
Prior Art

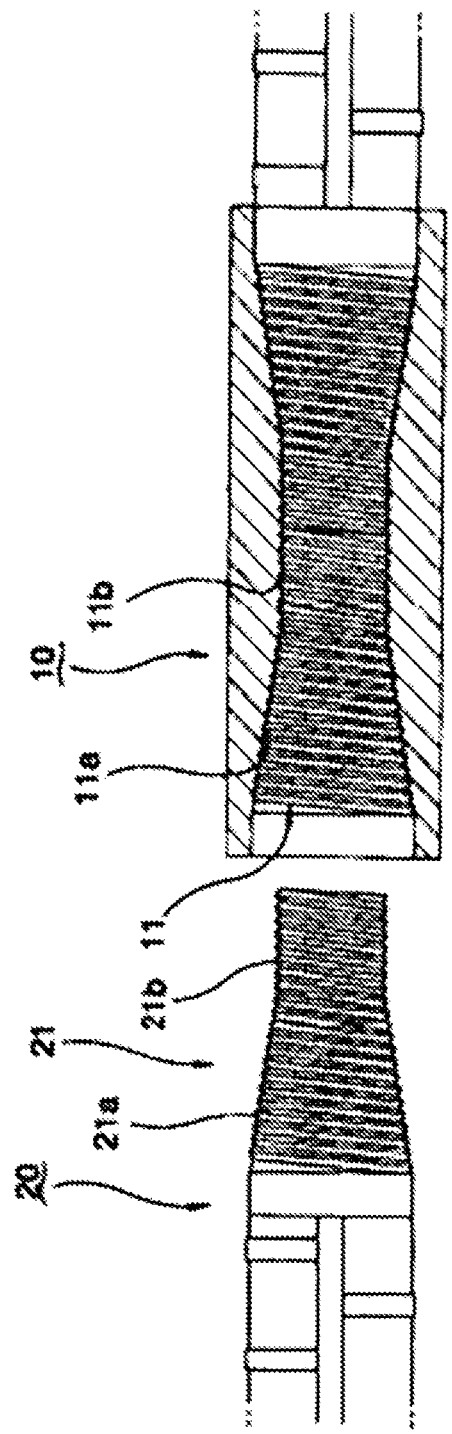
[Figure 16]

PARALLEL-TAPERED-INTEGRATED SCREW-COUPLING STRUCTURE FOR CONNECTING REINFORCING BARS

TECHNICAL FIELD

The present disclosure relates to a parallel-tapered-integrated screw-coupling structure for connecting reinforcing bars, and more particularly, to an invention that simultaneously couples a male-female parallel threaded-portion and a male-female tapered threaded-portion when screw-coupling a female screw member and a male screw member, that can couple screws with a low number of turning for coupling using this act, that does not need to align the start points of threads due to guidance of a tapered structure, and that reduces loosening after coupling.

BACKGROUND ART

In the related art, when female and male parallel screws are coupled to connect reinforcing bars which is well known in the art, since the numbers of required turning and the numbers of thread are the same, it is required to turn the screws until all threads are engaged for complete coupling and it takes long time to couple the screws in the process of turning by the number of treads. Further, it is required to align the axes and the start points of the threads in the early stage of engaging female and male threads.

In the related art, a rigid metal connecting rod for reinforcement that has a coupling sleeve having threads has been disclosed in U.S. Pat. No. US3,415,552. The tapered reinforcing bar end and coupling sleeve disclosed in this patent are components that include coupling of female and male screws using tapered screws.

According to a coupling way only by female and male tapered screws, the number of required turning for complete coupling can be reduced in comparison to coupling of female and male parallel screws, so quick coupling is possible and guidance is possible by the tapered structure when the male threads are inserted. However, since an unstable coupling state between the screws exists for the limit of the tapered structure when the screws start to be coupled and resistance is insufficient after the screws are coupled, there is a possibility that when there is an axial flow or vibration occurs, the screws are loosened or pulled out even with a tensile force smaller than that of parallel screws.

Further, referring to X1 in FIG. 4 showing an embodiment of the related art in which a tapered screw and a parallel screw are simply combined, when the tapered screw is positioned at the end portion of a reinforcing bar and is disposed at an end portion further than the parallel screw, the female screw 34 and the male screw 35 interfere with each other in insertion because the maximum major diameter of the tapered screw and the major diameter of the parallel screw are the same. Accordingly, it is difficult to insert deeply and couple the tapered screw without screw-turning, so there is a defect that the number of required turning for complete coupling is smaller than that of a parallel screw but unavoidably larger than that of a tapered screw and it is difficult to form threads.

On the contrary, as for the case in which a parallel screw is positioned at an end portion of a reinforcing bar such that the parallel screw is disposed at an end portion further than a tapered screw, as shown in FIG. 16, a connecting structure of a reinforcing bar has been disclosed in Korean Patent No. 10-0439628. The connecting structure of a reinforcing bar is composed of a connecting socket having female threaded-portions symmetrically formed at both ends and a reinforcing bar having a male thread part formed at an end to be screw-coupled to an end of the connecting socket, in which a tapered tightening female threaded-portion 11$a$ is formed on the outer side of a female threaded-portion 11 of the connecting socket 10, a horizontal tension female threaded-portion 11$b$ is continuously formed inside the tightening female threaded-portion 11$a$, a horizontal tension male threaded-portion 21$b$ that is screw-coupled to the tension female threaded-portion 11$b$ of the connecting socket 10 is formed at an end of a male threaded-portion 21 of the reinforcing bar 20, and a tapered tightening male threaded-portion 21$a$ that is screw-coupled to the tightening female threaded-portion 11$a$ of the connecting socket 10 s continuously formed inside the tension male threaded-portion 21$b$.

According to this configuration, however, since the threads of the tension female threaded-portion 11$b$ and the tension male threaded-portion 21$b$ form parallel threaded-portions, the number of required turning for coupling is unavoidably larger than that of the tapered threaded-portions and it would be required to align the axes of the female and male parallel threaded-portions for screw coupling even after inserting the reinforcing bar into the connecting socket to actually fasten the connecting socket and the reinforcing bar.

Further, the tapered threaded-portions are coupled only after the parallel screw arts are coupled and the final parallel thread are completely engaged, so it would be expected that the parallel threads and the tapered threads cannot be simultaneously engaged.

Accordingly, the present disclosure discloses an invention that keeps the advantages of a parallel screw and a tapered screw and solves the problems of a parallel screw and a tapered screw.

DISCLOSURE

Technical Problem

An objective of the present disclosure is to form a parallel female threaded-portion and a parallel male threaded-portion with a certain diameter regardless of the maximum minor diameter of a tapered female threaded-portion or the maximum major diameter of a tapered male threaded-portion.

Further, an objective is to be able to insert a tapered screw deep without turning the screw.

Further, an objective is to engage all of parallel-tapered threads while reducing the number of turning for coupling.

Further, an objective is to simultaneously couple a parallel threaded-portion and a tapered threaded-portion.

Further, an objective is to be able to lock threads engaged with each other without a lock nut.

Further, an objective is to reduce distortion of straightness in comparison to coupling through only a tapered screw.

Further, an objective is to generate guidance when a male screw member is inserted.

Further, an objective is to enable quick screw-coupling.

Further, an objective is to minimize loosening of a screw.

Technical Solution

In order to achieve the objectives of the present disclosure, the present disclosure provides a screw-coupling structure of a female screw member and a male screw member for connecting reinforcing bars, in which the female screw member includes a parallel-tapered-integrated female threaded-portion at which a parallel female threaded-portion composed of parallel threads is formed on an inner surface thereof and a tapered female threaded-portion of which a minor diameter decreases is integrally formed at an end of the parallel female threaded-portion, the male screw member includes a parallel-tapered-integrated male threaded-portion at which a parallel male threaded-portion composed of parallel threads is formed on an outer surface thereof and a tapered male threaded-portion of which a major diameter decreases is integrally formed at an end of the parallel male threaded-portion, a minor diameter of the parallel female threaded-portion is larger than a maximum minor diameter of the tapered female threaded-portion, a major diameter of the parallel male threaded-portion is larger than a maximum major diameter of the tapered male threaded-portion, a thread-discontinuous portion is formed between the parallel female threaded-portion and the tapered female threaded-portion and between the parallel male threaded-portion and the tapered male threaded-portion, and the minor diameter of the parallel female threaded-portion is larger than the maximum major diameter of the tapered male threaded-portion.

The female screw member and the male screw member are formed to be temporarily coupled such that the tapered male threaded-portion of the male screw member is completely inserted in the female screw member without screw-turning.

The female screw member and the male screw member are formed to be temporarily coupled such that female and male tapered threaded-portions and female and male parallel threaded-portions all can be engaged.

The male screw member and the female screw member are integrated with a reinforcing bar, the male screw member or the female screw member is integrated at an end of the reinforcing bar, or the male screw member is integrated at both ends of the reinforcing bar, or the female screw member is integrated at both ends of the reinforcing bar, or the male screw member and the female screw member are integrated at both ends of the reinforcing bar, respectively.

The male screw member and the female screw member are integrated with the reinforcing bar through friction welding.

When male screw members are integrated at both ends of the reinforcing bar, turning directions of threads of the male screw members at the both ends are the same or opposite to each other, when female screw members are integrated at both ends of the reinforcing bar, turning directions of threads of the female screw members at the both ends are the same or opposite to each other, and when a male screw member and a female screw member are integrated at both ends of the reinforcing bar, respectively, turning directions of threads of the male screw member and the female screw member at the both ends are the same or opposite to each other.

The parallel-tapered-integrated male threaded-portion is formed directly on the reinforcing bar by threading an end of the reinforcing bar.

The present disclosure provides a parallel-tapered-integrated screw-coupling structure between a female screw member and a male screw member for connecting reinforcing bars, in which the female screw member is a reinforcing bar coupler in which two parallel-tapered-integrated female threaded-portions, at which a parallel female threaded-portion composed of parallel threads is formed on an inner surface thereof and a tapered female threaded-portion of which a minor diameter decreases is integrally formed at an end of the parallel female threaded-portion, are formed on the same axial line such that taper thread directions face each other, the male screw member is a reinforcing bar that includes a parallel-tapered-integrated male threaded-portion at which a parallel male threaded-portion composed of parallel threads is formed on an outer surface thereof and a tapered male threaded-portion of which a major diameter decreases is integrally formed at an end of the parallel male threaded-portion, a thread-discontinuous portion is formed between the parallel female threaded-portion and the tapered female threaded-portion and between the parallel male threaded-portion and the tapered male threaded-portion, and the minor diameter of the parallel female threaded-portion is larger than the maximum major diameter of the tapered male threaded-portion.

Turning directions of the two parallel-tapered-integrated female threaded-portions formed at the reinforcing bar coupler to face each other are the same or opposite to each other.

Advantageous Effects

According to the present disclosure, since a thread-discontinuous portion is formed between the parallel female threaded-portion and the tapered female threaded-portion and between the parallel male threaded-portion and the tapered male threaded-portion, there is an effect that the parallel female threaded-portion or the parallel male threaded-portion can be formed with a certain diameter regardless of the maximum minor diameter of the tapered female threaded-portion or the maximum major diameter of the tapered male threaded-portion.

Further, since the minor diameter of the parallel female threaded-portion is larger than the maximum major diameter of the tapered male threaded-portion, there is an effect that the tapered male threaded-portion of the male screw member can be completely inserted in the female screw member without screw-turning for temporal coupling.

Further, since when the female screw member and the male screw member are turned to the coupled, the female and male parallel threaded-portions and the female and male tapered threaded-portions are simultaneously engaged, respectively, there is an effect that it is possible to engage all of parallel-tapered threads while reducing the number of turning for coupling.

Further, since the tapered threads and the parallel threads are threads that are all engaged with each other, there is an effect that the parallel threaded-portions and the tapered threaded-portions are simultaneously engaged.

Further, since when coupling is completed, the tapered threads and the parallel threads are tightened to each other, respectively, there is an effect that the threads engaged with each other can be locked even without a lock nut.

Further, since the female screw member and the male screw member include coupling by the parallel threaded-portions, there is an effect that they can have straightness by the parallel threaded-portions after coupling and distortion of straightness is smaller than coupling only by the tapered threaded-portions.

Further, since when the male screw member is inserted into the female screw member, the axis is naturally aligned by the angle made of the taper, there is an effect that the male screw member is guided when it is inserted.

Further, since it is possible to remove the work of aligning axes in early coupling which should be performed every time when reinforcing bars are coupled, it is possible to increase the efficiency in work of coupling reinforcing bars.

Further, since it is not required to separately fit the start points of threads when inserting the male screw member into the female screw member, there is an effect that quick screw-coupling is possible.

Further when the female screw member and the male screw member are formed as a parallel-tapered-integrated one-thread screw, there is an effect the parallel-tapered screw structure is quickly coupled like a multi-thread screw.

Further, loosening of the screw can be minimized because the lead angle of the screw is decreased like a single-thread screw.

DESCRIPTION OF DRAWINGS

FIG. 1 is a partial cross-sectional view of an embodiment of the present disclosure.

FIG. 2 is a view showing a female screw member having a parallel-tapered-integrated female threaded-portion.

FIG. 3 is a view showing a male screw member having a parallel-tapered-integrated male threaded-portion.

FIG. 4 is a view showing a difference of coupling depths in temporal coupling in an embodiment of the related art and an embodiment of the present disclosure.

FIG. 5 is a view showing a temporal coupling state by a first embodiment.

FIG. 6 is a view showing a temporal coupling state by a second embodiment.

FIG. 7 is a view showing a temporal coupling state by a third embodiment.

FIG. 8 is a view showing a 0-turn state after temporal coupling of the first embodiment.

FIG. 9 is a view showing a 1-turn state after temporal coupling of the first embodiment.

FIG. 10 is a view showing a 2-turn state after temporal coupling of the first embodiment.

FIG. 11 is a view showing a 3-turn state after temporal coupling of the first embodiment.

FIG. 12 is a view showing a 4-turn state after temporal coupling of the first embodiment.

FIG. 13 is a view showing a reinforcing bar, a female screw member, and a male screw member.

FIG. 14 is a view showing an embodiment a female screw member having parallel-tapered-integrated female threaded-portions formed at both sides.

FIG. 15 is a view showing an embodiment of the related art.

BEST MODE

Hereinafter, a parallel-tapered-integrated screw-coupling structure for connecting reinforcing bars is described in detail.

In the specification, a parallel screw is a screw of which the minor diameter and the major diameter are constant in the axial direction and a tapered screw is a screw of which the minor diameter and the major diameter are increased or decreased in the axial direction to make a tapered angle.

Further, unless described otherwise, "including" any components will be understood to imply the including of other components but not the exclusion of any other components.

Hereinafter, the present disclosure is described in detail.

Referring to FIGS. 1 to 3, a parallel-tapered-integrated screw-coupling structure of the present disclosure includes a female screw member 20, a male screw member 30, a parallel-tapered-integrated female threaded-portion 21, and a parallel-tapered-integrated male threaded-portion 31.

The female screw member 20 includes a parallel-tapered-integrated female threaded-portion 21 at which a parallel female threaded-portion P1 composed of parallel threads is formed on the inner surface thereof and a tapered female threaded-portion T1 of which the minor diameter decreases is integrally formed at an end of the parallel female threaded-portion P1.

The female screw member 20 has the parallel female threaded-portion P1 and the tapered female threaded-portion T1 that are formed in parallel on the inner surface, in which the tapered female threaded-portion T1 is formed inside further than the parallel female threaded-portion P1.

The male screw member 30 includes a parallel-tapered-integrated male threaded-portion 31 at which a parallel male threaded-portion P2 composed of parallel threads is formed on the outer surface thereof and a tapered male threaded-portion T2 of which the major diameter decreases is integrally formed at an end of the parallel male threaded-portion P2.

The tapered threads T1 and T2 and the parallel threads P1 and P2 that are formed in sizes corresponding to each other for screw-coupling are all engaged for screw-coupling.

To this end, the minor diameter DP1 of the parallel female threaded-portion P1 is larger than the maximum minor diameter DT1 of the tapered female threaded-portion T1.

That is, the minor diameter of the tapered female threaded-portion T1 gradually increases toward the parallel female threaded-portion P1, but the maximum minor diameter DT1 of the tapered female threaded-portion T1 is smaller than the minor diameter DP1 of the parallel female threaded-portion P1.

Further, the major diameter DP2 of the parallel male threaded-portion P2 is larger than the maximum major diameter DT2 of the tapered male threaded-portion T2.

That is, the major diameter of the tapered male threaded-portion T2 gradually increases toward the parallel male threaded-portion P2, but the maximum major diameter DT2 of the tapered male threaded-portion T2 is smaller than the major diameter DP2 of the parallel male threaded-portion P2.

Accordingly, the tapered threads T1 and T2 and the parallel threads P1 and P2 may be threads that are all engaged with each other.

Thread-discontinuous portions 23 and 33 may be formed between the parallel female threaded-portion P1 and the tapered female threaded-portion T1 and between the parallel male threaded-portion P2 and the tapered male threaded-portion T2.

The discontinuous portions 23 and 33 may be formed in any shape and any way as long as the threads are discontinuous.

For example, a recession that is recessed in circumferential band shape may be formed. That is, series of a tapered threaded-portion, a recession, and a parallel threaded-portion T1-23-P1 and T2-33-P2 are formed by the recession. Accordingly, the threads of the tapered threaded-portions T1 and T2 are not continuous.

However, it is not necessary to form such a recession to make the threads discontinuous and various configurations that make the threads discontinuous are possible.

When the threads are discontinuous, it is easy to form threads, and the parallel female threaded-portion P1 or the parallel male threaded-portion P2 can be formed with a certain diameter regardless of the maximum minor diameter DT1 of the tapered female threaded-portion T1 or the maximum major diameter DT2 of the tapered male threaded-portion.

Accordingly, the effective cross-sectional areas of the tapered threaded-portions T1 and T2 and the parallel threaded-portions P1 and P2 are added, whereby resistance against tension, etc. can be provided.

The minor diameter DT1 of the parallel female threaded-portion P1 is made larger than the maximum major diameter DT2 of the tapered male threaded-portion for effective and quick screw-coupling.

Interference between threads can be fundamentally avoided in screw-coupling by this configuration.

Accordingly, when the female screw member 20 and the male screw member 30 are turned to couple, the parallel threaded-portions P1 and P2 and the tapered threaded-portions T1 and T2 are simultaneously coupled, respectively, so there is an effect that it is possible to reduce the number of turning for coupling and engage all of the parallel-tapered threads using this fact.

That is, since the tapered threads and the parallel threads are all engaged, respectively, there is an effect that the parallel threaded-portions P1 and P2 and the tapered threaded-portions T1 and T2 are simultaneously coupled, respectively.

Further, when coupling is completed, the tapered threads T1 and T2 and the parallel threads P1 and P2 are tightened to each other, respectively, whereby the threads engaged with each other can be locked even without a lock nut. Accordingly, self-locking is possible, so a slip at the joints of reinforcing bars in the early stage can be removed.

Since the female screw member 20 and the male screw member 30 include coupling by the parallel threaded-portions P1 and P2, so they can have straightness by the parallel threaded-portions P1 and P2 after coupling, and an effect that distortion of straightness is smaller than coupling only by the tapered threaded-portions T1 and T2 would be expected.

The materials of the female screw member 20 and the male screw member 30 are metal.

Referring to X1 of FIG. 4, according to the embodiment of the related art in which a tapered screw and a parallel screw are simply combined, the female screw 35 and the male screw 34 interfere with each other in insertion because the maximum major diameter of the tapered screw and the major diameter of the parallel screw are the same (36). Accordingly, the temporal coupling depth D1 is limited, so it was impossible to insert and temporarily couple the tapered screw deep without screw-turning.

However, according to the present disclosure, as shown in X2 of FIG. 4, since the female screw member and the male screw member are formed such that the minor diameters of the parallel female threaded-portions are larger than the maximum major diameters of the tapered male threaded-portions, so the tapered threaded-portions can be in contact with each other (37) and the parallel threaded-portions can be spaced apart from each other (38) in temporal coupling. As a result, the temporal coupling depth depends on whether the tapered threaded-portions and the parallel threaded-portions are brought in contact with each other, so the temporal coupling depth can be larger in X2 than X1.

That is, the male screw member can be inserted and temporarily coupled in the female screw member without screw-turning to a coupling start point between the tapered threads of the female and male tapered threaded-portions (FIG. 5), or a simultaneous coupling start point between the tapered threads of the female and male tapered threaded-portions and the parallel threads of the female and male parallel threaded-portions (FIG. 6), or a coupling start point between the parallel threads of the female and male parallel threaded-portions (FIG. 7). Accordingly, the coupling depth D2 in temporal coupling can be increased (D2>D1).

When the minor diameter DP1 of the parallel female threaded-portion P1 is larger than the maximum minor diameter DT1 of the tapered female threaded-portion T1, the tapered male threaded-portion T2 of the male screw member 30 is fully inserted in the female screw member 21 without screw-turning to be temporarily coupled.

That is, the tapered male threaded-portion T2 of the male screw member 30 can be temporarily coupled deep to a depth where it is not exposed to the outside by being fully inserted in the female screw member 21.

Accordingly, it is possible to remove the work of aligning axes in early coupling which should be performed every time when reinforcing bars are coupled, so it is possible to increase the efficiency in work of coupling reinforcing bars.

Referring to FIG. 5, first, as a first embodiment, a female screw member 202 and a male screw member 203 may be temporarily coupled such that female and male tapered threaded-portions are in contact with each other (200) and female and male parallel threaded-portions are spaced apart from each other (201).

If there is one thread line, an embodiment in which when female and male tapered threads are turned 0.5 times, the female and male parallel threads start to be engaged.

Accordingly, when one pitch is 2.5, the distance 204 between coupling start points of the female and male parallel threaded-portions when the female and male tapered threaded-portions are in contact with each other is 1.25 mm that is ½ of 2.5 mm.

There is no need for finding out the coupling start points of the tapered threads of the female and male tapered threaded-portions. The female and male threads are naturally fitted to each other in the process of turning.

Accordingly, when the male screw member 203 is inserted into the female screw member 202, the axis is naturally aligned by the angle made of the taper, so there is an effect that the male screw member 203 is guided when it is inserted.

Accordingly, it is not required to separately fit the start points of threads, so there is an effect that quick screw-coupling is possible.

It is required to fit the start points of threads to initial engagement of the threads in parallel screws, but the present disclosure is an invention including screw-coupling of parallel screws in the configuration and does not need to fit the start points.

When the screw starts to be turned in the thread direction after temporal coupling, the parallel screws start to be coupled and the tapered screws also immediately start to be coupled.

Referring to FIG. 6, next, as a second embodiment, a female screw member 302 and a male screw member 303 may be temporarily coupled such that female and male tapered threaded-portions and female and male parallel threaded-portions are all simultaneously brought in contact with each other (300 and 301).

In this embodiment, since the tapered threaded-portions and the parallel threaded-portions are all in contact with each other in temporal coupling (300 and 301), when the screw members are turned in the turning direction, the female and male tapered threaded-portions and the female and male parallel threaded-portions all start to be engaged.

Referring to FIG. 7, next, as third embodiment, a female screw member 402 and a male screw member 403 may be temporarily coupled such that female and male tapered threaded-portions are spaced apart from each other (400)

and female and male parallel threaded-portions are brought in contact with each other (401).

In this embodiment, when the screw starts to be turned in the thread direction after temporal coupling, the parallel screws start to be coupled and the tapered screws also immediately start to be coupled.

As a result, when the screws start to be turned in the thread directions after temporal coupling, the tapered screws and the parallel screws are all coupled in any case.

As described above, the female screw member and the male screw member are configured to be temporarily coupled such that the female and male tapered threaded-portions and the female and male parallel threaded-portions all can be coupled.

The female screw member and the male screw member may be single-thread or multi-thread screws.

A single-thread screw can be moved forward by a pitch when it is turned one round, so it is difficult to quickly couple, but the lead angle of the screw decreases, so the screw can be less loosened when vibration or axial tension is generated.

A two-thread screw can be moved forward by double the pitch when it is turned one round, so it can be quickly coupled, but the lead angle of the screw is increased, so the screw is easily loosened when vibration or axial tension is generated.

Further, a three-thread screw can be more quickly coupled, but it is more easily loosened.

Preferably, when the female screw member and the male screw member are formed as a parallel-tapered-integrated one-thread screw, there is an effect the parallel-tapered screw structure is quickly coupled like a multi-thread screw and loosening of the screw can be minimized because the lead angle of the screw is decreased like a single-thread screw.

Further, when quicker coupling is required, the female screw member and the male screw member may be formed as multi-thread screws.

The first embodiment is described in more detail hereafter.

Referring to FIGS. 8 to 12, the female screw member 40 has a taper angle of 6° from the axial direction, is a single-thread screw, the tapered female threaded-portion 43 has a pitch of 2.5 mm, a maximum minor diameter of 33.42 mm, and eighteen tapered female threads, and the parallel female threaded-portion 45 has a pitch of 2.5, a minor diameter of 36.78 mm, and four parallel female threads.

The male screw member 41 has a taper angle of 6° from the axial direction, is a single-thread screw, the tapered male threaded-portion 42 has a pitch of 2.5 mm, a maximum major diameter of 35.51 mm, and eighteen male threads, and the parallel male threaded-portion 44 has a pitch of 2.5 mm, a major diameter of 38.68 mm, and four parallel male threads.

When the tapered female and male threaded-portions are in contact with each other in a temporal coupling state, the parallel female threaded-portion 45 and the parallel male threaded-portion 44 are spaced 1.25 mm apart from each other.

Since the minor diameter of the parallel female threaded-portion 45 is larger than the maximum major diameter 35.51 mm of the tapered male threaded-portion 42 (36.78 mm>35.51 mm), when the male screw member 41 is inserted, the tapered male threaded-portion 42 is not interfered with by the parallel female threaded-portion 45.

When the male screw member 41 is accurately axially inserted in the female screw member 40, the initial contact point is the coupling start point MT of the tapered female threaded-portion 42 and the tapered male threaded-portion 42.

Since the temporal coupling state is stilled maintained, the parallel female threaded-portion 45 and the parallel male threaded-portion 44 keep spaced apart from each other.

Since the gap 48 is 1.25 mm, the parallel screws initially start to be coupled around 0.5-turn of the male screw member 41.

The contact point MT is a 0-turn point of the parallel thread.

Referring to FIG. 9, in 1-turn coupling of the parallel threads, the tapered threads are all coupled by ¼ of the total coupling distance. The parallel threads and the tapered threads simultaneously start to be engaged.

Referring to FIG. 10, in 2-turn coupling of the parallel threads, the tapered threads are all coupled by 2/4 of the total coupling distance.

Referring to FIG. 11, in 3-turn coupling of the parallel threads, the tapered threads are all coupled by ¾ of the total coupling distance.

Referring to FIG. 12, in 4-turn coupling of the parallel threads, the tapered threads are all coupled by 4/4 of the total coupling distance, whereby screw-coupling is completed.

That is, every time the male screw member 41 is turned one round, the male screw member 42 is moved forward by the pitch 2.5 mm, and accordingly, all of the tapered threaded-portions 42 and 43 are integrally engaged and are completely engaged after four rounds.

As a result, when the male screw member 41 is turned four rounds, a total of twenty two threads of eighteen tapered threads and four parallel threads are completely engaged at a time.

Since all of the tapered threaded-portions 42 and 43 are all engaged at a time when the parallel threaded-portions 44 and 45 are completely engaged, all of twenty two threads of a single-thread screw are completely coupled only by four rounds (number of turning:number of coupled threads=4: 22).

Further, when the tapered female threaded-portion 43, the tapered male threaded-portion 42, the parallel female threaded-portion 45, and the parallel male threaded-portion 44 are each a two-thread screw, the male screw member 41 is moved forward by a pitch 5 mm every time it is turned one round and all of twenty two threads can be completely engaged by only two rounds (number of turning:number of coupled threads=2:22).

A phase difference between the thread end point of the tapered female threaded-portion 43 and the thread start point of the parallel female threaded-portion 45 and a phase difference between the thread end point of the tapered male threaded-portion 42 and the thread start point of the parallel male threaded-portion 44 may correspond to each other.

That is, they may be formed such that the phase differences are the same or within a predetermined tolerance within a range in which screw-coupling is possible.

Further, the coupling structure of the parallel-tapered-integrated female and male threaded-portions 46 and 47 has a characteristic in which the structure of a tapered threaded-portion and the structure of a parallel threaded-portion compensate for each other, so it is possible to improve resistance against transverse force more than a coupling structure by only parallel screws or a coupling structure by only tapered screws.

The taper angle, whether it is a single-thread screw or a multi-thread screw, the pitch, the number of tapered threads, the number of parallel threads, the maximum major diameter of the tapered male threaded-portion 42 of the male screw member 41, the major diameter of the parallel male threaded-portion 44, the maximum minor diameter of the tapered female threaded-portion 42 of the female screw member 40, and the minor diameter of the parallel female threaded-portion may be varied, if necessary.

The shapes of the threads of the female screw member and the male screw member are various. If the cross-section of the threads may be a polygon, a trapezoid, a sew tooth shape, or a round shape. In particular, when large force is required, the threads of the female screw member and the male screw member may be formed in a sew tooth shape or a rounded shape.

Referring to FIG. 13, the male screw member 101 or the female screw member 102 may be integrated at one end 108 or both ends of a reinforcing bar 105.

That is, a male screw member or a female screw member may be integrated at an end of a reinforcing bar, a male screw member may be integrated at both ends of a reinforcing bar, a female screw member may be integrated at both ends of a reinforcing bar, or a male screw member or a female screw member may be integrated at both ends of a reinforcing bar.

The male screw member 101 may be a solid member.

If the solid male screw member 101 may be a solid male screw member having a shaft part and thread formed around the shaft part for screw-connection. A solid male screw member for screw-connection is integrated with the reinforcing bar 105. For example, the screw may be integrated with the reinforcing bar 105 to extend by various types of welding such as friction welding 106, stud welding, electronic beam welding, laser welding, $CO_2$ welding, argon welding, butt welding, and flash welding. The weld reinforcement in friction welding can be removed after machining.

The female screw member 102 may be a female screw member 102 having a body and thread on the inner surface of the body and being able to perform screw-connection.

The female screw member 102 for screw-connection may be integrated with the reinforcing bar 105. For example, the screw may be integrated with the reinforcing bar 105 by various types of welding such as friction welding 107, stud welding, electronic beam welding, laser welding, $CO_2$ welding, argon welding, butt welding, and flash welding. The weld reinforcement in friction welding can be removed after machining.

For example, a solid male screw member 101-a reinforcing bar 105-a solid male screw member 101-a solid male screw member 101-a reinforcing bar 105-a female screw member 102, and a female screw member 102-a reinforcing bar 105-a female screw member 102 each may be integrated.

In these cases, threads may be formed in the same direction or opposite directions between the members at both sides of the reinforcing bar.

That is, when male screw members are integrated at both ends of the reinforcing bar, the turning directions of the threads of the male screw members may be the same or opposite to each other. When female screw members are integrated at both ends of the reinforcing bar, the turning directions of the threads of the female screw members may be the same or opposite to each other. When a male screw member and a female screw member are integrated at both ends of the reinforcing bar, respectively, the thread of the female screw member and the thread of the male screw member may be formed in the same direction or opposite directions to each other.

For example, when the turning directions of threads are opposite to each other and male screw members are integrated at both ends of a reinforcing bar, the left end is formed as a right-hand screw and the right end is formed as a left-hand screw. Accordingly, when reinforcing bars are connected to both ends, easy coupling is possible.

Further, when the sizes of the members integrated at both ends of the reinforcing bar are different from each other, different-diameter connection is possible. That is, when male screw members are integrated at both ends of the reinforcing bar, the sizes of the male screw members at both ends may be made different from each other, or when female screw members are integrated at both ends of the reinforcing bar, the sizes of the female screw members at both ends may be made different from each other, or when a male screw member and a female screw member are integrated at both ends of the reinforcing bar, respectively, the sizes of the male screw member and the female screw member at both ends may be made different from each other.

Accordingly, for example, when construction is progressed upward from the bottom using reinforcing bars, even if it is required to connect reinforcing bars with different thickness, that is, reinforcing bars with different diameters, it is possible to cope with this case through different-diameter connection.

Further, though not shown, various configurations is possible such as a case in which a parallel-tapered-integrated male threaded-portion is formed only at a side of the reinforcing bar and a specific member is not bonded to the other side or a case in which a parallel-tapered-integrated female threaded-portion is formed at a side and a fixing member is formed at the other side.

In particular, a female screw member may be applied even to an embodiment in which only one parallel-tapered-integrated female threaded-portion is formed and may be applied even to an embodiment in which a plurality of parallel-tapered-integrated female threaded-portions is formed. The parallel-tapered-integrated female threaded-portion has a shape having a tapered threaded-portion inside and a parallel threaded-portion outside.

Referring to FIG. 14, the female screw member 141 may be a coupler that has a pair of parallel-tapered-integrated female threaded-portions 143 with tapered female threaded-portions of the parallel-tapered-integrated female threaded-portions 143 facing each other in a pair to connect male screw members from both sides.

That is, two parallel-tapered-integrated female threaded-portions 143 may be formed to face each other in the taper thread portion. Reinforcing bars each have a parallel-tapered-integrated male threaded-portion 144 may be screw-coupled to the parallel-tapered-integrated female threaded-portions 143 formed to face each other from both sides so that the reinforcing bars are connected.

Accordingly, the female screw member 141 is a reinforcing bar coupler that connects reinforcing bars that are the male screw members 142 from both sides.

When the female screw member 141 is a reinforcing bar coupler, the turning directions of the threads of the parallel-tapered-integrated female threaded-portions 143 facing each other may be the same or opposite to each other.

Further, in order to form the parallel-tapered-integrated male threaded-portion, it may be possible to directly form the parallel-tapered-integrated male threaded-portion at ends of a reinforcing bar through methods, for example, by performing threading through a form rolling device (a flat dies, a rolling dies, etc.) after direct cooling swaging, finishing, and chamfering, or cutting-threading after cooling swaging on the ends of the reinforcing bar.

An anti-slip means for easy holding of a tool may be formed in a predetermined section on the outer surface of the male screw member 142. That is, the anti-slip means is formed by any one selected from cases when a spline is formed on an outer surface, when an outer surface is knurled, when a transverse cross-section has a circular shape, when a cross-section has a polygonal shape, and when one or more pairs of grip surfaces are formed at positions facing each other, whereby it is possible to easily turn the female screw member 141 to tighten it.

When the sizes of a pair of parallel-tapered-integrated female threaded-portions 143 are made different, different-diameter connection is possible. For example, when construction is progressed upward from the bottom using reinforcing bars, even if it is required to connect reinforcing bars with different thickness, that is, reinforcing bars with different diameters, it is possible to cope with this case through different-diameter connection.

The invention claimed is:

1. A parallel-tapered-integrated screw-coupling structure, comprising:
   a female screw member including a parallel-tapered-integrated female threaded-portion at which a parallel female threaded-portion composed of parallel threads is formed on an inner surface thereof and a tapered female threaded-portion of which a minor diameter decreases is integrally formed at an end of the parallel female threaded-portion; and
   a male screw member including a parallel-tapered-integrated male threaded-portion at which a parallel male threaded-portion composed of parallel threads is formed on an outer surface thereof, and a tapered male threaded-portion of which a major diameter decreases is integrally formed at an end of the parallel male threaded-portion,
   wherein the male screw member is a solid male screw member for threaded connection, the male screw member including a shank and threads formed around a circumferential surface of the shank,
   wherein
      a minor diameter of the parallel female threaded-portion is larger than a maximum minor diameter of the tapered female threaded-portion,
      a major diameter of the parallel male threaded-portion is larger than a maximum major diameter of the tapered male threaded-portion,
      a thread-discontinuous portion is formed between the parallel female threaded-portion and the tapered female threaded-portion and between the parallel male threaded-portion and the tapered male threaded-portion, and
      the minor diameter of the parallel female threaded-portion is larger than the maximum major diameter of the tapered male threaded-portion,
   wherein
      the male screw member or the female screw member are integrated with a reinforcing bar, such that
         the male screw member or the female screw member is integrated at an end of the reinforcing bar, or
         the male screw member is integrated at both ends of the reinforcing bar, or
         the female screw member is integrated at both ends of the reinforcing bar, or
         the male screw member and the female screw member are integrated at both ends of the reinforcing bar, respectively,
   wherein,
      at a temporary-coupled state of the female and male screw members,
         the female and male tapered threaded-portions are in mutual contact while the female and male parallel threaded-portions are mutually spaced apart, or
         the female and male tapered threaded-portions and the female and male parallel threaded-portions are all in simultaneous contact, or
         the female and male tapered threaded-portions are mutually spaced apart while the female and male parallel threaded-portions are in mutual contact,
   wherein,
      upon rotation in a screw-tightening direction,
         the tapered threaded-portions begin engagement before the parallel threaded-portions, or
         the tapered threaded-portions and the parallel threaded-portions begin engagement simultaneously, or
         the parallel threaded-portions begin engagement before the tapered threaded-portions,
   wherein the thread-discontinuous portion is a recess formed as an annular groove in the circumferential direction.

2. The parallel-tapered-integrated screw-coupling structure of claim 1, wherein the male screw member and the female screw member are integrated with the reinforcing bar through friction welding.

3. The parallel-tapered-integrated screw-coupling structure of claim 1, wherein when the male screw member is integrated at both ends of the reinforcing bar, turning directions of threads of the male screw member at the both ends are the same or opposite to each other,
   when the female screw member is integrated at both ends of the reinforcing bar, turning directions of threads of the female screw member at the both ends are the same or opposite to each other, and
   when the male screw member and the female screw member are integrated at both ends of the reinforcing bar, respectively, turning directions of threads of the male screw member and the female screw member at the both ends are the same or opposite to each other.

4. The parallel-tapered-integrated screw-coupling structure of claim 1, wherein the parallel-tapered-integrated male threaded-portion is formed directly on the reinforcing bar by threading an end of the reinforcing bar.

5. A parallel-tapered-integrated screw-coupling structure, comprising:
   a female screw member which is a reinforcing bar coupler in which two parallel-tapered-integrated female threaded-portions, at which a parallel female threaded-portion composed of parallel threads is formed on an inner surface thereof and a tapered female threaded-portion of which a minor diameter decreases is integrally formed at an end of the parallel female threaded-portion, are formed on the same axial line such that taper thread directions face each other; and
   a male screw member which is a reinforcing bar that includes a parallel-tapered-integrated male threaded-portion at which a parallel male threaded-portion composed of parallel threads is formed on an outer surface thereof, and a tapered male threaded-portion of which a major diameter decreases is integrally formed at an end of the parallel male threaded-portion, wherein the male screw member is a solid male screw member for threaded connection, the male screw member including a shank and threads formed around a circumferential surface of the shank,
wherein
  a thread-discontinuous portion is formed between the parallel female threaded-portion and the tapered female threaded-portion and between the parallel male threaded-portion and the tapered male threaded-portion, and
  the minor diameter of the parallel female threaded-portion is larger than the maximum major diameter of the tapered male threaded-portion,
wherein
  the male screw member is integrated with the reinforcing bar, such that
    the male screw member is integrated at an end of the reinforcing bar, or
    the male screw member is integrated at both ends of the reinforcing bar,
wherein,
  at a temporary-coupled state of the female and male screw members,
    the female and male tapered threaded-portions are in mutual contact while the female and male parallel threaded-portions are mutually spaced apart, or
    the female and male tapered threaded-portions and the female and male parallel threaded-portions are all in simultaneous contact, or
    the female and male tapered threaded-portions are mutually spaced apart while the female and male parallel threaded-portions are in mutual contact,
wherein,
  upon rotation in a screw-tightening direction,
    the tapered threaded-portions begin engagement before the parallel threaded-portions, or
    the tapered threaded-portions and the parallel threaded-portions begin engagement simultaneously, or
    the parallel threaded-portions begin engagement before the tapered threaded-portions,
  wherein the thread-discontinuous portion is a recess formed as an annular groove in the circumferential direction.

6. The parallel-tapered-integrated screw-coupling structure 5, wherein turning directions of the two parallel-tapered-integrated female threaded-portions formed at the reinforcing bar coupler to face each other are the same or opposite to each other.

\* \* \* \* \*